Sept. 28, 1943. T. A. BOWERS 2,330,550
RING MEANS FOR PISTONS
Filed Aug. 20, 1941
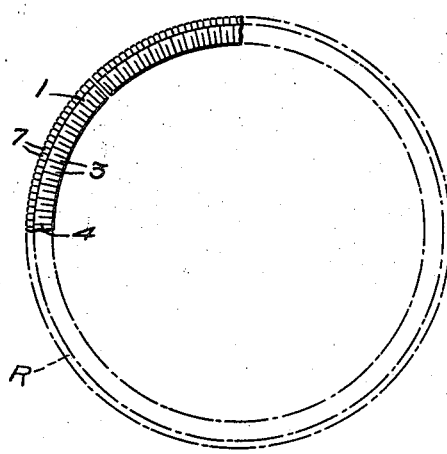
Fig.1.
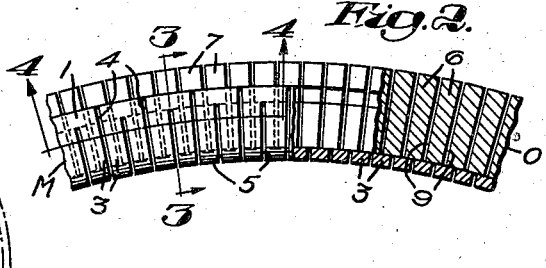
Fig.2.
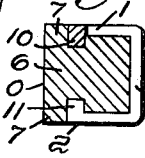
Fig.3.
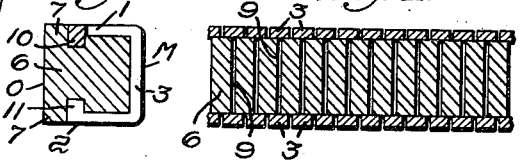
Fig.4.
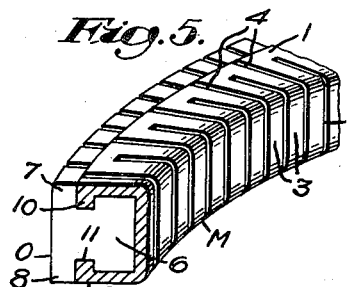
Fig.5.
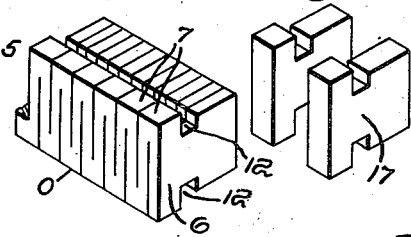
Fig.6. Fig.7.
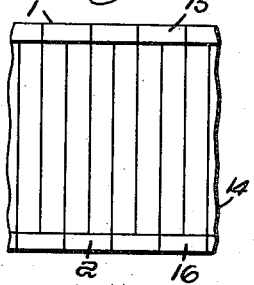
Fig.8.
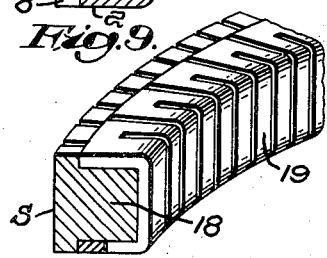
Fig.9. Fig.10.
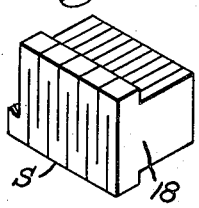
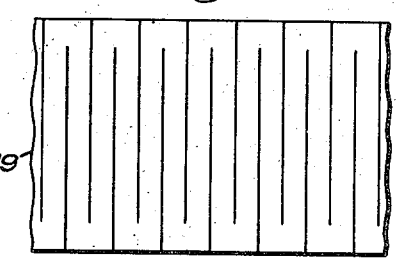
Fig.11.
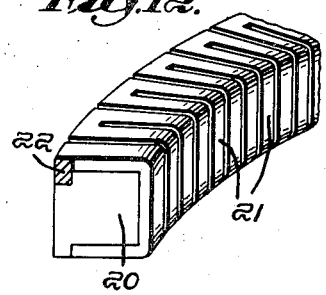
Fig.12.
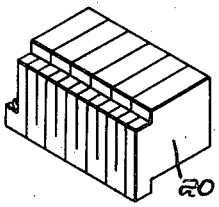
Fig.13.
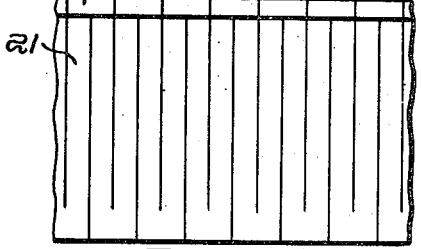
Fig.14.
Inventor:
Thomas A. Bowers
Elmer W. Hamilton
by Attorney Patented Sept. 28, 1943

2,330,550

UNITED STATES PATENT OFFICE 2,330,550

RING MEANS FOR PISTONS

Thomas A. Bowers, Mattapoisett, Mass., assignor to Power Research Corporation, Boston, Mass., a corporation of Massachusetts Application August 20, 1941, Serial No. 407,575

3 Claims. (Cl. 309—44)

This invention relates to piston rings and more especially to flexible piston rings of the type in which a plurality of spaced-apart segments of piston ring material are resiliently connected together in annular rows.

It is a principal object of the invention to improve piston rings and to devise a simple, cheap, flexible piston ring assembly in which different types of piston ring material are combined with a view to facilitating cutting operations while providing for desirable weight, durability and size. The invention also aims to provide a novel means of supporting and sealing a plurality of axially disposed walls of piston ring material arranged in an annular row.

The nature of the invention, and its objects, will be more fully understood from the following description of the drawing and discussion relating thereto.

In the accompanying drawing:

Fig. 1 is a plan view of the ring of the invention;

Fig. 2 is an enlarged fragmentary plan view and partial cross section of the ring;

Fig. 3 is a cross section taken on the line 3—3 of Fig. 2;

Fig. 4 is a cross section taken on the line 4—4 of Fig. 2;

Fig. 5 is an enlarged fragmentary perspective view of the ring;

Fig. 6 is a fragmentary perspective detail view of a ring element;

Fig. 7 is an enlarged perspective view of another ring element;

Fig. 8 is a fragmentary plan view of still another ring element;

Fig. 9 is an enlarged perspective view of a modification of ring;

Fig. 10 is an enlarged perspective view of a ring element employed in the ring modification of Fig. 9;

Fig. 11 is a plan view of another ring element employed in the ring modification of Fig. 9; and Figs. 12, 13, and 14 are fragmentary perspective views illustrating still another modification of piston ring.

In an earlier Patent No. 2,224,338, issued to me December 10, 1940, I have described and claimed a sheet metal oil control piston ring and its method of manufacture, in which a strip of piston ring material is cut to provide partially severed crowns along edges of the strip and supporting portions for the crowns intermediate the edges of the strip. The strip thus formed is bent longitudinally of itself and again annularly, to form the ring in which the crowns occur in circumferentially movable relation with respect to one another to develop flexibility.

In accordance with the present invention, I provide a piston ring assembly R made up of an inner retaining ring member M and an outer ring body O. The retaining ring M is of somewhat the same type as the ring of the above noted patent, and includes an upper annular row of crowns 1 and a lower annular row of crowns 2, connected together by resilient connecting portions 3. The crowns 1 are circumferentially spaced apart to present slits 4, and the crowns 2 are circumferentially spaced apart to present slits 5. These slits or spaces provide for the crowns being circumferentially movable, thereby to impart resiliency to the ring.

Mounted between the rows of segments of the ring M and in abutting relation with respect to the connecting portions 2, is a plurality of axially disposed walls 6, making up the outer ring body O. The walls are attached one to another at their tops and bottoms by connectors 7 and 8. The walls 6 further extend radially outward beyond the retaining ring M, and the upper and lower surfaces of the connectors 7 and 8, respectively, occur in the same planes as the upper and lower surfaces of the crowns 1 and 2 (Fig. 5).

Preferably the connectors 7 are arranged in overlapping relation with respect to the slits 4 of the retaining ring, and the connectors 8 are arranged in overlapping relation with respect to the slits 5 of the retaining ring. In addition, the connecting portions 3 of the retaining ring M overlie openings 9 between walls 6 along three sides of the ring, while the edges of the walls 6 overlap the slits 4 and 5 also on three sides of the ring.

This overlapping of portions of the ring with respect to slits or openings between other portions therein may be readily obtained by employing suitable widths or thicknesses of metal in the retainer ring M and the ring body O. The crowns 1 and 2 may, for example, be of a circumferential width of three or four thirty-seconds of an inch, and the connecting portions 3 of a circumferential width of one or two thirty-seconds of an inch. The openings 9 between the walls 6 are preferably of much smaller circumferential width, as for example three or four-thousandths of an inch, which allows the connecting portions 3 to extend across and overlap the openings 9. Similarly the circumferential width of the walls 6 may be, for example, one to two thirty-seconds of an inch, while the slits or openings 4 and 5 are of three or four-thousandths of an inch, thus providing for the edges of the walls 6 extending across the openings 4 and 5.

The walls 6 are retained between the upper and lower sides of the retaining ring M by means of annular ribs 10 and 11, formed along the edges of crowns 1 and 2. These annular ribs 10 and 11 are engaged in corresponding openings 12 formed in the walls 6 at points adjacent the connectors 7.

It is pointed out that the ribs 10 and 11 prevent any substantial displacement of the walls 6 in a direction radially of the retaining ring M, but allow the walls 6 to move circumferentially with respect to one another at all times and independently of gas pressure forcing the retaining ring M axially downward against the walls. This effect is obtained by the inherent circumferentially extensible character of the ring element M, as provided by the circumferentially movable segment construction. There is thus obtained a desirable combination of one circumferentially extensible ring body O supported in overlapping relation with a second circumferentially extensible ring element M.

A preferred method of making the ring assembly is to first form the retaining ring M by cutting a strip of resilient piston ring material 14, having relatively thick edges 15 and 16, to form crowns 1 and 2 along edges of the strip, and connecting portions for the crowns. The strip thus cut is bent longitudinally and then into an annular shape with edges of the strip occurring in spaced-apart parallel relation.

The walls 6 may be readily obtained by reversely folding another strip of piston ring material transversely of itself, and then bending the reversely folded stock into a circle. Portions of the tops and bottoms of the reversely folded material are cut away to provide the openings 12, and adjacent relieved surfaces (Fig. 6). If desired, a plurality of separately formed walls 17, as illustrated in Fig. 7, may be brought together in an annular row and then clipped into an upright position between the sides of the retaining ring M.

An important feature of the invention is the combination, with a plurality of axially disposed walls of piston ring material, of ring means for both supporting the walls so that they remain circumferentially movable, and for overlying and closing the openings between the walls so as to provide a substantially gas-tight body. The edges of the walls 6 seal the slits 4 and 5 in the retaining ring M, thus rendering this member highly adapted to functioning as a compression ring. The connectors 7 exert a further sealing action with respect to the slits 4 and 5. By the use of the walls 6, a desirable spacing and filling of the retainer ring M is obtained. It is pointed out that all of these sealing and spacing effects are carried out while preserving circumferential extensibility throughout the whole ring assembly.

Another important feature is the variation in types of material which may be employed in making the component parts of the ring. A very thin metal strip may be used to form the retaining ring M and this is an advantage in shearing operations. A relatively thick metal may be used to form the walls 6 and this allows simple and cheap corrugating or transverse bending operations. Various other changes in the metals may also be resorted to.

In Figs. 9, 10 and 11 I have shown a modified ring structure S made up of walls 18 supported in a retaining ring 19. In this form of ring, the ring is clinched around three sides of the walls without resorting to the use of a rib as illustrated in Fig. 5.

A still further ring modification is illustrated in Figs. 12, 13 and 14, in which a ring of axially disposed walls 20 is supported in a retaining ring 21, one edge of which is formed with a rib 22 adapted to be engaged over the outer recessed periphery of ring 20, as shown in Fig. 12.

It will be seen that I have combined a ring made up of axially disposed walls with means for not only resiliently supporting the walls in circumferentially movable relation to one another, but also for substantially closing the spaces between these walls. At the same time, a segmental ring is combined with resiliently connected walls to improve the operation and sealing character of the segmental ring.

While I have shown a preferred embodiment of my invention, it should be understood that various changes and modifications may be resorted to in keeping with the spirit of the invention as outlined by the appended claims.

I claim:

1. A piston ring comprising a strip of piston ring material reversely bent upon itself to form webs and connecting crown portions, said crown portions at one side of the ring extending inward throughout a part only of the radial width of the ring, edges of said strip of piston ring material constituting the outer periphery of the ring, a retaining ring member formed of resilient sheet metal, said retaining ring member being of a substantially U-shaped cross section and lying in contact with the reversely folded strip of piston ring material along three sides thereof, said retaining ring being formed with a plurality of overlapping openings which define circumferentially movable segments, each opening extending at least partly across each side of said retaining ring, the said connecting portions of the reversely bent strip at one side of the ring overlying alternate extremities of the said overlapping openings, thereby to close alternate openings at their outer extremities.

2. A circumferentially extensible and compressible piston ring comprising a strip of piston ring material reversely bent upon itself to form webs and connecting crown portions, the lines of bending of the strip extending radially of the ring, said ring deriving circumferential extensibility and flexibility from movement of the webs relative to one another in a direction circumferential of the ring, a circumferentially extensible and compressible retaining ring member comprising a second strip of resilient piston ring material having a U-shaped cross section, said retaining ring being formed with a plurality of overlapping openings extending transversely of the said second strip to define circumferentially movable U-shaped segments, each opening extending at least partly across each side of said retaining ring, the retaining ring lying in contact with the reversely folded strip along three sides thereof whereby the said retaining ring functions to limit the circumferential extensibility of the reversely folded strip, and the reversely folded strip acts to limit axial flexibility of the retaining ring.

3. A circumferentially extensible and compressible piston ring comprising a strip of piston ring material reversely bent upon itself to form webs and connecting crown portions, the lines of bending of the strip extending radially of the ring, said ring deriving circumferential extensibility and flexibility from movement of the webs relative to one another in a direction circumferential of the ring, a circumferentially extensible and compressible retaining ring member comprising a second strip of resilient piston ring material having a U-shaped cross section, said retaining ring being formed with a plurality of overlapping openings extending transversely of the said second strip to define circumferentially movable segments, each opening extending at least partly across each side of said retaining ring, the retaining ring having one edge engaged in the reversely folded strip and the remainder of the retaining ring lying in contact with three sides of the reversely folded strip for the purpose of limiting circumferential extensibility.

THOMAS A. BOWERS.